Nov. 6, 1923.

K. ROSAK

GRINDING MACHINE

Filed Aug. 29, 1921

Inventor:
Karl Rosak
by Emil Bonnelycke,
Attorney.

Nov. 6, 1923.
K. ROSAK
1,473,520
GRINDING MACHINE
Filed Aug. 29, 1921
2 Sheets-Sheet 2
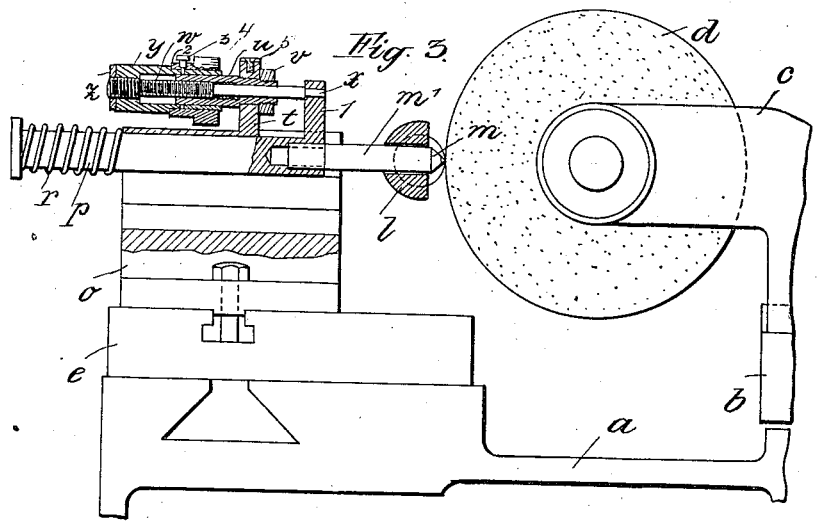
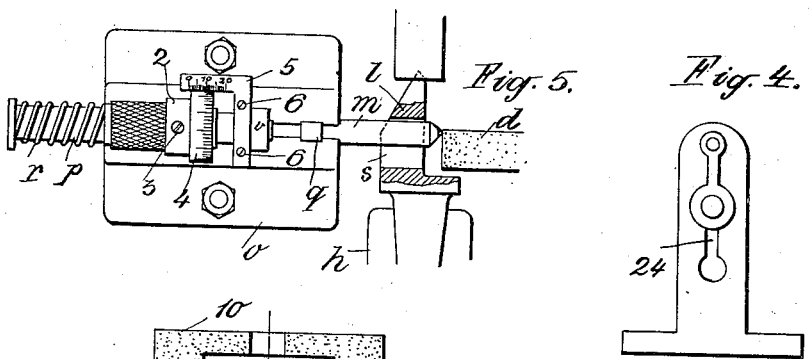
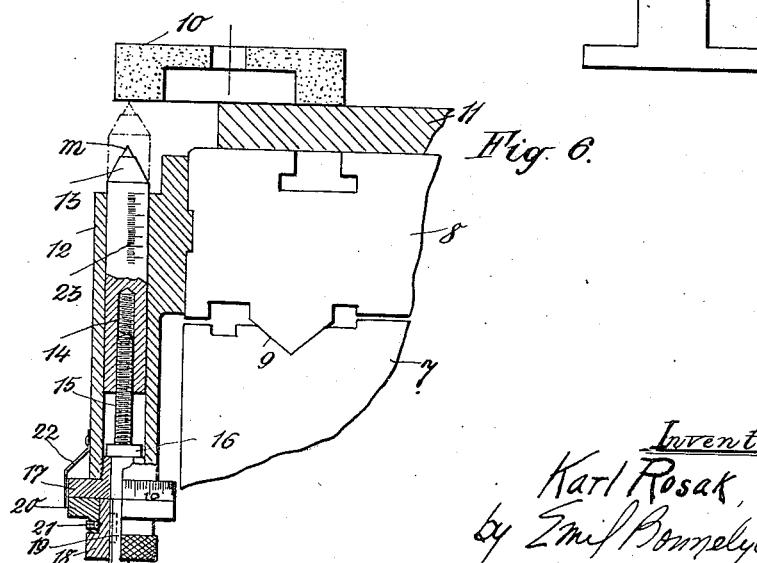
Inventor:
Karl Rosak,
by Emil Bonnelycke
Attorney Patented Nov. 6, 1923.

1,473,520

UNITED STATES PATENT OFFICE.

KARL ROSAK, OF BERLIN, GERMANY, ASSIGNOR TO SCHNELLWERKZEUG GESELLSCHAFT MIT BESCHRÄNKTER HAFTUNG (BRIESEN), A CORPORATION OF GERMANY.

GRINDING MACHINE.

Application filed August 29, 1921. Serial No. 496,585.

*To all whom it may concern:*

Be it known that I, KARL ROSAK, a citizen of the Czechoslovakian Republic, residing at Berlin, N. W. 87, Wullenweberstr. 6, in the State of Germany, have invented certain new and useful Improvements in or Relating to a Grinding Machine, of which the following is a specification.

In grinding machines in which either the carriage supporting the grinding disc reciprocates relatively to the work, or conversely the carriage carrying the work reciprocates relatively to the grinding disc, it is known to effect, automatically or by hand, an adjustment or feed of the disc or of the work in the transverse direction, that is to say in the direction towards each other, until the work has been ground to the correct thickness. As during the process of grinding the grinding disc wears out, the thickness of the work has to be measured after the grinding is finished and the grinding disc must then be further advanced by hand until the difference due to the wearing of the grinding disc, is made up again. It sometimes happens that the advance in question is too great as it has to be effected by hand by the attendant. The work is then liable to be ground too thin and therefore becomes useless.

The drawback above referred to is obviated according to the present invention by providing a turning or truing-device for the grinding disc, said grinding disc moving, during the longitudinal movement relative to the work, past the said turning device which is set in such a manner that the grinding disc comes into engagement with the same and is ground as soon as the grinding tool has been advanced or fed beyond the desired extent.

This device could be so arranged that the setting of the turning or truing tool for the grinding disc, is at the same time utilized for fixing the exact dimension of the article to be machined. The setting device for the truing tool is then provided with a scale, the zero of which corresponds to a given line of the grinding machine, for instance in circular grinding machines to the spindle axis and in flat grinding machines to the surface of the bed or table or the like. The setting of the turning tool to a given dimension ensures then at the same time the grinding of the work to the desired dimension. This setting device could be further provided according to the invention with means for enabling the regulation to be effected to suit the degree of hardness and the fineness of grain of the grinding disc.

Two constructions according to the invention are illustrated in the accompanying drawing in which—

Fig. 3 shows in vertical section on an enlarged scale the setting device for the turning or truing tool, Fig. 4 is a detail hereinafter referred to, Fig. 5 is a plan of Figure 3, and Fig. 6 shows the setting device for the truing tool for flat grinding machines.

Figure 1:
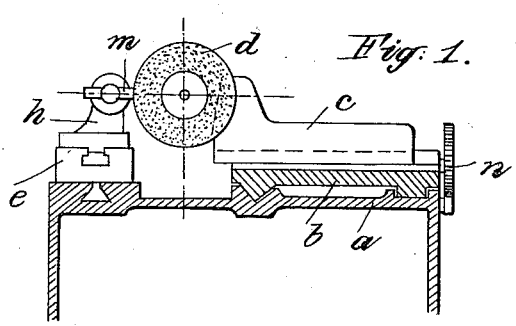
Fig. 1 is a partial section through part of a circular grinding machine.
Figure 2:
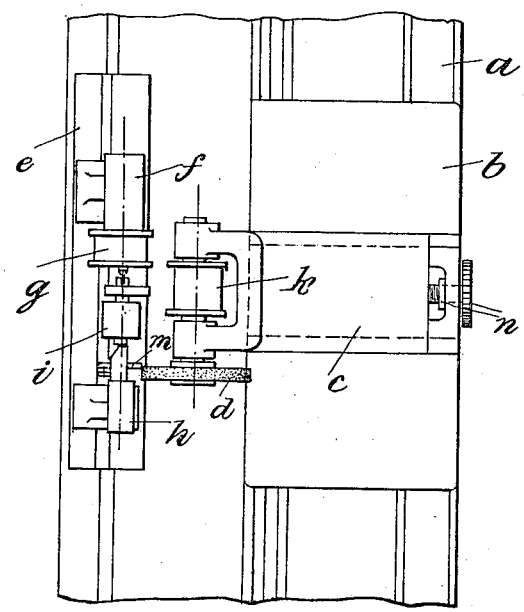
Fig. 2 is a plan corresponding to Figure 1.

In the arrangement shown in Figures 1–5 a carriage $b$ is mounted on guides on the bed $a$ of the machine so that it is adjustable in the longitudinal direction of the machine. The carriage $b$ is provided with a sliding bracket $c$ carrying the grinding disc $d$. Moreover on the bed of the machine is mounted a slide rest $e$ which carries the devices for fixing the work. In the construction illustrated, said devices comprise a headstock $f$, the spindle of which carries a driving pulley $g$ and a movable headstock $h$ with the back centre $l$. Between the two headstocks is fixed in well known manner the work $i$ which is to be ground. The grinding disc $d$ is mounted on a spindle which carries a driving pulley $k$. The pulleys $g$ and $k$ are driven in the usual manner, for instance from an overhead countershaft.

According to the invention, on the slide rest $e$ is mounted a diamond $m$, or other device for turning or truing grinding discs, in such a manner that during the movement of the grinding disc relatively to the work, the grinding disc passes in front of the diamond. In the construction illustrated, the truing diamond $m$ is mounted for instance in a bracket $o$ which is secured to the movable headstock $h$ or, as shown in Figure 3, direct to the plate $e$. The diamond $m$ which could be of course replaced by any other turning tool must be adjustable towards the grinding disc $d$. To that end, the diamond holder $m^1$ is secured in a sliding block $p$ substantially cylindrical in shape but provided with an upward projection $q$. The said block slides in a bore in the bracket $o$, and the upward projection $q$ moves in a corresponding slot in said bracket which slot however does not extend throughout the whole length of the bracket but only to the extent through which a movement of the projection $q$ is required. A spring $r$ tends to pull the sliding block $p$ together with the diamond $m$ towards the left in Figure 3, that is to say away from the grinding disc $d$. The diamond holder $m^1$ passes through an elongated hole $s$ in the back centre $l$ in order to enable the latter to be moved longitudinally for the purpose of loosening the work without it being necessary to withdraw the diamond holder. The bracket $o$ has an upward projection $t$ in which is mounted a sleeve $u$ which is secured in position by means of a nut $v$. The sleeve $u$ is provided internally with a screw thread with which engages a spindle $w$. One end of this spindle is mounted in the projection $q$ whilst the opposite end is screwed into a sleeve $y$ which engages the sleeve $u$ and is held fast therein by means of a locknut $z$. On the outside, the sleeve $y$ carries a ring 2 which can rotate on said sleeve and be locked in any desired position by means of a set screw 3. The said ring is provided with a flange-like projection 4 which, as shown in Figures 3 and 5, is provided with a scale division on its periphery. To the projection $t$ is secured by means of screws 6 a scale 5 as shown more particularly in Figure 5.

In this setting device shown in Figures 3–5 the diamond holder $m^1$ is always pulled by the spring $r$ away from the grinding disc $d$ and the projection $q$ engages the spindle $w$. If the diamond $m$ is to be moved towards the grinding disc, the spindle $w$ is turned by means of the sleeve $y$. The scales 4 and 5 indicate then the extent to which the diamond is advanced, namely the scale 5 in millimeters and the scale 4, in the event of the same having a hundred divisions on the circumference, in hundredths of a millimeter.

The device is preferably so arranged that the scales indicate zero when the diamond point coincides exactly with the axis of the rotating work, or the axis of the back centre $l$. The diameter of the part to be ground can then be read exactly on the scale. When therefore the work to be ground is to have say a radius of 15 mm., the spindle $w$ is turned until the scales 4 and 5 indicate 15 mm. The point of the diamond $m$ is then located 15 mm. from the axis of rotation of the work and the grinding can be continued until the work has a radius of 15 mm. If the grinding is continued, the grinding disc $d$ will be turned in passing in front of the diamond $m$.

It is important that the bracket $o$ and the setting device mounted on the same, should always retain their position and not be dismantled again, so as to avoid any inaccuracies. In order, however, to be able to remove the block $p$ with the diamond holder $m^1$ from the machine, the bore through which said block passes is adjoined at the bottom by a recess 24 (Figure 4) the shape of which corresponds to that of the projection $q$. To remove the block $p$ the latter is pressed, in opposition to the action of the spring $r$, towards the grinding disc $d$ until the projection $q$ is in front of the bracket $o$, whereupon the block is turned through an angle of 180° so that it passes through the recess 24 and the whole block $p$ can be withdrawn.

A similar arrangement can be used in flat grinding machines, as shown in Figure 6. In the said figure, 7 is a part of the bed of the grinding machine on which the grinding table or carriage 8 is reciprocated at right angles to the plane of the drawing by means of the triangular guide 9. 10 is the grinding disc which rotates about a vertical axis and 11 the work to be ground resting on the table 8 to which is secured a casing 12 for the diamond holder 13. The diamond holder has an internal screwthread 14 with which engages a spindle 15, prevented from moving in the axial direction by means of a collar 16 with a nut 17 inserted into the casing 12. To the spindle 15 beyond the nut 17 is secured, for instance by means of keys 19 or the like a ring 18 so that by rotating said ring the spindle 15 will be likewise rotated and the diamond holder 13 will be moved axially. On the ring 18 is mounted a ring 20 provided with a scale and adapted to be locked by means of a set screw 21. The setting or adjustment of the said ring can be read by means of a pointer 22 or by an index on the surface of the casing 12. The millimeter scale 23 is provided on the diamond holder itself. The scales are again so arranged that in the zero position thereof the diamond point is situated exactly in the plane of the table 8. If a piece of work 11 of a given height is to be ground, it is merely necessary to set on the scales the height in question, as indicated by dotted lines in Figure 6 without any subsequent measuring being required.

In both cases, that is to say in Figures 3–5 as well as in Figure 6, the scale ring 2 or 20 is adjustably mounted. This is done because the grinding discs, according to the fineness of their grain and to their hardness, grind to a different degree for the same adjustment. It may therefore happen that when soft grinding discs are used, the device works correctly whereas when hard discs are employed the finished dimensions of the ground article will no longer agree exactly with the measurement indicator on the scale. In order to enable this difference—which it is true amounts to so small fractions of a millimeter—to be compensated, the above mentioned adjustability of the scale rings is provided. When a different grinding disc is to be used, the set screw 3 or 21 is loosened and the scale is adjusted in accordance with a ground and measured article.

The working of the device is therefore such that after the fixing of the work the diamond, or other tool used for truing the grinding disc, is so set by means of the scales that the scales indicate the desired extent of grinding. The machine is then thrown into gear, the carriage $b$ in the construction shown in Figures 1-5 with the grinding disc $d$ being then reciprocated in front of the work $i$. In the construction according to Figure 6, the grinding disc 10 has no movement of translation, that is to say, it merely rotates, whilst the slide 8 with the work 11 and the diamond $m$ is moved in front of the grinding disc. The travel in both cases is calculated so that the grinding disc passes in front of the diamond $m$. During the reciprocation, the slide is fed forward by hand or by an automatic feed device, diagrammatically indicated at $n$ in Figures 1 and 2, so that the work is gradually ground thinner. When the correct thickness of the work has been reached the grinding disc comes within reach of the turning diamond and if a further advance or feeding of the disc is effected, the grinding disc in passing will be turned down by said diamond to the same extent as that of the advance, so that no further removal of material from the work is possible. The work will be therefore ground to the exact thickness required even when the disc is worn out. It is merely necessary to stop the machine as soon as the attendant notices that the grinding disc is being turned by the diamond. This movement is clearly noticeable owing to the intense sparking and to the peculiar noise.

It is of course necessary to see that the advance of the grinding tool slide always takes place when the grinding disc is behind the diamond, so that after the advance it comes into engagement first with the diamond, and only then with the work.

An automatic disengaging or throwing out of gear device could be provided which would become operative only when the grinding disc is actually in engagement with the diamond. The existing automatic throwing out of gear or disengaging devices would therefore have to be moved a few feet further back compared to the position in which they are usually set, in order that the feed may continue until the grinding disc comes into engagement with the diamond.

The construction illustrated in Figures 1-5 shows the device on a circular grinding machine with one grinding disc and one piece of work. It could be of course equally well applied to grinding machines having several spindles.

The setting device for the diamond shown in Figures 3-6 offers the above mentioned advantages. In certain cases however scale adjustment is omitted, and another adjustment device could be used for the diamond or other turning tools.

In those cases in which a large amount of material has to be removed and in which consequently the grinding of the work takes a long time, it is advisable, in order to economize time, that during the preliminary grinding the travel of the grinding disc and work towards each other should be made as short as possible. The grinding disc has then merely to pass in front of the work itself, without coming within reach of the turning or truing tool. It will be sufficient to set the stroke or travel of the slide so that the grinding disc passes in front of the truing tool, only after the work has been ground practically to its finished dimension.

Having now particularly described and ascertained the nature of my said invention and in what manner the same is to be performed, I declare that what I claim is:

1. In a grinding machine, the combination with a rotary grinding disc, and a holder for a work piece to be machined, one of said elements having a reciprocatory movement relative to the other, of means for effecting a relative feed movement between the work holder and the disc; a truing device for the grinding disc in front of which said disc passes during the normal relative reciprocatory movement between the disc and work holder; and a setting device for adjusting the position of the truing device so that the grinding disc automatically comes into contact therewith and is turned down or cut thereby when said disc is fed beyond the desired dimension of the work piece, whereby the grinding disc is prevented from continuing its grinding action on the work piece; said setting device being provided with scales settable to indicate the finished dimension of the work piece corresponding to each particular adjustment of the truing device.

2. In a grinding machine, the combination, with a rotary grinding disc, and a holder for a work piece to be machined, one of said elements having a reciprocatory movement relative to the other, of means for effecting a relative feed movement between the work holder and the disc; a truing device for the grinding disc in front of which said disc passes during the normal relative reciprocatory movement between the disc and work holder; a setting device for adjusting the position of the truing device so that the grinding disc automatically comes into contact therewith and is turned down or cut thereby when said disc is fed beyond the desired dimension of the work piece, whereby the grinding disc is prevented from continuing its grinding action on the work piece; and a ring provided with a scale and adjustably mounted on the setting device to regulate its position.

3. In a grinding machine, the combination, with a rotary grinding disc, and a holder for a work piece to be machined, one of said elements having a reciprocatory movement relative to the other, of means for effecting a relative feed movement between the work holder and the disc; a truing device for the grinding disc in front of which said disc passes during the normal relative reciprocatory movement between the disc and work holder; a setting device for adjusting the position of the truing device so that the grinding disc automatically comes into contact therewith and is turned down or cut thereby when said disc is fed beyond the desired dimension of the work piece, whereby the grinding disc is prevented from continuing its grinding action on the work piece; and a guide bracket for the truing device to permit the latter to be withdrawn towards the back from the bracket, without removing the setting device, after said truing device has been turned about its axis through a suitable angle.

In testimony whereof I have affixed my signature.

KARL ROSAK.